United States Patent [19]

Haardt et al.

[11] 4,407,766

[45] Oct. 4, 1983

[54] MOLDS AND PROCEDURE FOR PRODUCING TRUNCATED CONTACT LENSES

[75] Inventors: Henry Haardt, Henryville, Pa.; John Magdon, Phillipsburg, N.J.; Eric Noble, Smithtown, N.Y.

[73] Assignee: National Patent Development Corporation, New York, N.Y.

[21] Appl. No.: 266,782

[22] Filed: May 26, 1981

[51] Int. Cl.³ .............................................. B29D 11/00
[52] U.S. Cl. ..................................... 264/2.2; 249/117; 249/134; 249/155; 249/160; 351/160 H; 425/410; 425/412; 425/808
[58] Field of Search .......................... 264/1.1, 2.2, 2.5; 425/808, 410, 412; 351/160 R, 160 H, 174; 249/117, 134, 155, 160

[56] References Cited

U.S. PATENT DOCUMENTS

| 3,881,683 | 5/1975 | Whitney | 425/808 |
| 4,169,119 | 9/1979 | Covington | 264/2.5 |
| 4,208,364 | 6/1980 | Shepherd | 264/2.2 |
| 4,208,365 | 6/1980 | Le Fevre | 264/2.2 |
| 4,209,289 | 6/1980 | Newcomb et al. | 264/2.2 |
| 4,279,401 | 7/1981 | Ramirez et al. | 264/2.5 |

FOREIGN PATENT DOCUMENTS

| 69969 | 10/1975 | Australia | 351/160 H |
| 8726 | 3/1980 | European Pat. Off. | 351/160 H |
| 1360088 | 7/1974 | United Kingdom | 351/160 H |
| 2033101 | 5/1980 | United Kingdom | 351/160 H |

OTHER PUBLICATIONS

"A New Corneal Lens Design for the Correction of Residual Astigmatism", Broff, *The Optometric Weekly*, vol. 61, No. 1, Jan. 1, 1970, pp. 24 and 25.
"Physical Parameters for Prism Ballast PMMA Lenses", Roggenkamp, *Review of Optometry*, Apr. 1979, pp. 48–51.
Hydron (Polymacon) Toric Hydrophilic Contact Lens, Professional Fitting Guide; NPD Optics Inc., 1979.

*Primary Examiner*—James B. Lowe
*Attorney, Agent, or Firm*—Cushman, Darby & Cushman

[57] ABSTRACT

Truncated contact lenses are produced in a direct casting operation using a mold assembly of a male mold member and a female mold member, both of which have molding surfaces and only one of which is provided with an inwardly flexible continuous rim portion. When vulcanizable or polymerizable constituents are placed in the mold, the two mold members are brought together, the flexible rim is flexed inwardly and the finished lens of the desired shape is obtained. The flexible rim is composed of a circular portion having two ends and a straight line connecting the two ends. This defines a chord and provides the finished lens with the truncation desired.

Preferably the lens also has a toric surface and prism ballast to assist in positional stability of the lens on the eye of the wearer.

25 Claims, 6 Drawing Figures

MOLDS AND PROCEDURE FOR PRODUCING TRUNCATED CONTACT LENSES

BACKGROUND OF THE INVENTION

This invention relates to plastic contact lenses in which a small portion, for example, 1 to 1.5 mm, of an outer chord of the lens is not present. This is called truncation. Truncated plastic contact lenses are per se known and are used to ensure stability of the lens on the eye of the wearer, whereas round contact lenses are allowed to rotate freely on the layer of tears carrying same on the eye.

Correction of astigmatism requires a toric-shaped lens which must be held in position and stabilized from significant rotation to achieve the desired degree of correction. Toric contact lenses are thus often provided with truncation, either single or double in which two opposed parallel chords are made in the lens. The conventional procedure used to form a truncated lens is to prepare a complete toric lens then manually remove a small portion of the lens along the appropriate periphery to provide the truncation. Such manual operations are not only labor-intensive, but there is also the opportunity of introducing striations into the lens which must be removed by further manual operation.

Finished lenses are manually truncated in the following manner: the finished lens, if in the wet state, must be dried then, in a hand operation, the lens is guided on a cutting tool such as a grinding wheel, and the desired chord-shaped area is removed. With a toric lens further steps are necessary—the lens is inserted in a Vertexometer and the major axis of the toric surface is determined. Then the optimum toric lens-toric cornea relationship is determined with respect to the major axes of the toric lens-toric cornea surfaces to correct the astigmatic refractive error of the eye. This positional relationship is noted on the lens and while retaining such relationship the lens is truncated so that the resulting truncated lens will settle in a corrective position on the corneal surface with the truncation or chord-like area proximal to the lower eyelid. In approximately forty-five percent of the patients requiring toric contact lenses the major axis of the toric cornea is horizontal, i.e., 180°±5°. A toric lens with a single truncation rides on the cornea with its major axis "coinciding" with the major axis of the toric cornea and with the truncated area of the lens in a downward position, i.e., the truncation is considered to be parallel to both the major axis and the lower eyelid. The truncation step is followed by buffing the truncated edge in a conventional manner. Truncation of contact lenses, therefore, is time-consuming and labor-intensive.

This invention relates to molded toric contact lenses, either mono- or bitruncated, in which the finished lens is cast in a single operation in a novel mold assembly. Bitruncated lenses have the flat side of the truncations parallel to each other. In a single truncated lens the truncation will be "parallel" to the lower eyelid. During blinking of the eye the eyelid passes over the length of the truncated chord of the lens in a coinciding fashion rather than an acute angle which would tend to rotate the lens in the eye.

In a preferred aspect, this invention also relates to procedures and to molds for fabricating truncated plastic contact lenses having at least one toric surface and preferably including both prism ballast and cylinder. Lenses so produced exhibit outstanding positional stability and comfort to the wearer.

Toric contact lenses were first introduced by Stimpson in 1950 while the toric base contact lens was described in 1952 and 1953 by Schapero and Baglien. Prior art procedures for the manufacture of toric contact lens are time-consuming and fairly expensive and involve a considerable amount of hand finishing. Moreover, the apparatus used to fabricate such lenses are often elaborate and difficulty is encountered to achieve reproducible results. Illustrative patents include U.S. Pat. Nos. 3,079,737; 3,344,692; 3,482,906; 3,535,825; 3,623,800 and 3,950,082. Truncated lenses are conventionally made by removing a chord from the edge portion of a finished contact lens.

Casting methods are known for preparing contact lenses in order to reduce or eliminate costly machining and polishing of the lens; see U.S. Pat. No. 4,121,896 to T. H. Shepherd. According to the process described in this United States patent, complementing replica male and female mold members each having an optical molding surface are prepared by injection molding of a plastic composition in the master mold pairs. The plastic mold members are then longitudinally aligned and used to mold contact lenses, one of the molding surfaces being provided with a flexible circumferential rim which defines the periphery of the resulting lens. The lens-forming material which will constitute the lens is charged into the female mold member or portion. The complementing male member or portion is brought into contact with the female mold member so that the flexible rim portion is seated on the opposite molding surface. During molding the lens-forming material contracts causing the flexible rim to flex, inwardly usually, whereby the two mold members move towards each other. Once the molding cycle is completed the mold members are separated and the resulting contact lens is removed in a condition ready for use, except for cleaning and perhaps a buffing of the lens edge.

A toric lens comprises two basic parts, namely, a cylinder, to correct astigmatism of the eye, and means such as prism ballast and/or truncation, preferably both, for ensuring positional stability when placed on the cornea. Non-astigmatic lenses do not have such a requirement and the lens is allowed to rotate freely upon the layer of tears carrying it. Toric lenses, on the other hand, require proper, rather precise positioning in the eye. One procedure to achieve lens stability is to physically remove a small portion, e.g., 1 to 1.5 mm, of an outer chord of the contact lens (generally about 14 mm in diameter) from the finished lens. This is called truncation. Opposed parallel clippings are called double truncations.

Another means of achieving positional stability to a toric contact lens is to provide a somewhat larger mass of plastic material at or proximate an edge of the lens so that, in use, when the lens rotates this heavier edge will gravitate towards the bottom of the axis of rotation, i.e., the lower eyelid, and serve to stabilize the lens on the eye. This is known in the art as prism ballast. Preferably both prism ballast and truncation are employed.

A method for molding toric contact lenses is described in U.S. Pat. No. 4,208,365 to R. J. LeFevre in which, like the Shepherd patent, a mold system comprised of a pair of mold members is used to cast the lens, the desired toric optical surface being achieved by distorting the optical molding surface of one of the flexible mold members used to mold the lens. Distortion of the member is induced by tensioning means such as a torque ring surrounding the mold part to achieve the desired configuration. The mold system containing lens-forming material is then closed by positioning the mold members in lens-forming relationship with each other, the principal longitudinal axis of curvature of each mold member being in alignment. This casting technique produces the cylinder feature of a cast toric contact lens but lacks significant prism ballast.

A method for casting toric contact lenses having a prism ballast is described in copending application Ser. No. 199,780, filed Oct. 20, 1980 in the name of Eric Noble in which a mold assembly is comprised of lens-forming mold members: a first mold member having an optical concave toric molding surface, a second mold member having an optical convex molding surface, the principal longitudinal axis of curvature of each of said molding surfaces forming an angle θ when said mold members are in lens-forming relationship with each other. This procedure produces a prism ballast toric-shaped contact lens, which may be either hard or flexible, by casting in a closed mold system which compensates for shrinkage that occurs during polymerization or vulcanization of the lens-forming material used to make the lens. This process results in a prism ballasted toric lens that exhibits significant positional stability in the eye.

Molds made from thermoplastic materials and useful for casting contact lenses are described in U.S. Pat. Nos. 4,121,896 and 4,208,364 both to T. H. Shepherd and U.S. Pat. No. 4,208,365 to R. J. LeFevre; however as excellent as they are these molds do not deliver truncated contact lenses with prism ballast. Truncation requires a separate manual step.

The toric contact lenses made in accordance with the Noble procedure are stated to possess significant positional stability when placed in the eye of the wearer. While this is a meritorious advance in terms of casting a prism ballasted toric contact lens, lens rotation of upwards to approximately 10° from the normal can occur on the eye of the wearer. That is, the prism ballast feature of Noble's toric lens generally prevents the lens from rotating more than about 10° from its normal position (the position where the prism ballast is, so to speak, proximal to the lower eyelid).

In addition to the degree of rotation of the contact lens on the eye of the wearer the time required to return the lens to its "normal" position is also an important consideration. For the astigmatic wearer the period of time the lens is other than in the normal position represents time the wearer has imperfect vision. We have found that when truncated lenses made as herein described are properly placed to correct astigmatism, the return to normal time, when the lens is rotated out of position, is surprisingly short.

The replica mold member with a continuous flexible rim about both the circular section and the "straight line" chord section as well are readily fabricated employing conventional injection molding techniques using metal master mold parts and thermoplastic resins, e.g., polypropylene. A description of the metal master mold parts is described hereinafter.

One of the objects of the present invention is to provide a replica mold that will faithfully produce a truncated plastic contact lens in virtually finished form. Also included in our invention are methods of making such molds, preferably of plastic, for regular, toric and toric/ballasted lenses. Truncated lenses so produced will exhibit excellent positional stability of less than approximately 4° average rotation from the norm and under optimum conditions lenses are obtained in which the rotation is no greater than approximately 2° in a majority of the cases. As truncated lenses are normally associated with the need to stabilize the lens in one position, as for instance the correction of corneal and refractive astigmatism, lenses so produced are normally toric and preferably ballasted as well, although the present invention need not be so restricted.

Another object of our invention is to cast a truncated plastic contact lens, either rigid or flexible, preferably a toric, ballasted lens in a single molding operation so that the thus cast lens requires no or virtually no manual finishing and in which truncation is effected in a manner that retains the corrective astigmatic relationship of the resulting toric lens on the toric cornea of the wearer.

Another object of the invention is to provide a truncated, cast contact lens with prism ballast with exceptional positional stability rotating, if at all, only a few degrees from the normal position on the eye of the wearer.

These and other objects of the invention will be apparent from the following more detailed description.

SUMMARY OF THE INVENTION

The present invention is concerned with apparatus useful in the manufacture of truncated contact lenses and to methods utilizing such apparatus in the production of such lenses. The resulting truncated contact lenses are produced by direct casting and are characterized by a circular outer surface, a portion of which is interrupted by a straight line forming a chord on the outer surface. Inasmuch as such lenses are typically used to correct astigmatism, a preferred aspect of the invention is concerned with truncated lenses which are further characterized by cylinder and prism ballast. Such lenses exhibit outstanding positional stability rotating, if at all, only a few degrees from the "normal" position on the eye of the wearer. The invention also includes a novel truncated plastic contact lens mold system, a novel process for preparing truncated toric contact lenses using this mold system and a process for injection molding the novel plastic replica mold from thermoplastic material using a metal master mold system.

In one aspect of the invention there is provided a mold assembly comprised of lens-forming mold members, one such mold member having an optical concave molding surface and a principal longitudinal axis of curvature, a second such mold member having an optical convex molding surface and a principal longitudinal axis of curvature, these two longitudinal axes of curvature forming an angle "θ", hereinafter discussed and shown in the appended drawings, when the said mold members are in lens-forming relationship with each other.

Another aspect of the invention includes directly casting a truncated plastic contact lens in a novel mold of the type herein described including: (a) charging a contact lens-forming material into one portion of a mold, (b) closing the mold assembly by positioning the two mold parts together, and (c) subjecting the lens-forming material to activating conditions to produce the desired contact lens.

In a preferred aspect the invention is directed to a process of casting a truncated, prism ballasted toric contact lens from a mold assembly comprised of a first mold portion having an optical concave toric molding surface and a second mold portion having an optical convex molding surface, preferably one of the molding surfaces having a continuous, flexible rim integral therewith, in the truncated shape of the periphery of the lens to be produced thus defining the shape of the lens desired. The process comprises: (a) charging a contact lens-forming material onto the molding surface of the first mold portion; (b) closing the mold assembly by positioning said second mold portion in lens-forming relationship with the first mold portion at an angle θ with respect to the principal longitudinal axes of curvature of each of the molding surfaces, the angle θ not exceeding 20°; (c) distorting or crimping one of the mold portions, typically the second or female mold portion, into the configuration needed to provide the desired toric optical surface (the mold portion may have a toric optical surface per se thus eliminating the distorting or crimping step); and (d) subjecting the lens-forming material to activating conditions for a period of time sufficient to produce a contact lens characterized by a front optical convex toric surface, a back optical concave surface, and truncation with outstanding positional stability when in use as a contact lens.

One embodiment the present invention features is the use of multi-component molding system either the male portion or the female portion or both being fabricated of flexible material, e.g., thermoplastic material such as polypropylene. Both the male portion and female portion are provided with an optical molding surface, e.g., spherical, which have a predetermined curvature and one of these surfaces is provided with a continuous, flexible rim thereon in the approximate truncated shape of the lens desired. In the manner of the LeFevre patent mentioned above, means are provided to place a predetermined measured stress or force on one flexible mold portion, preferably the female mold portion, at or in the proximity of the periphery of its optical molding surface. This force causes a distortion of its normal molding surface whereby it assumes the configuration of a toric surface. Alternatively, the optical molding surface of the mold portion, preferably the male mold portion, may have a toric configuration which is obtained directly from the complementary metal master mold portion. Lens-forming material is then charged onto the optical toric molding surface of the female mold portion. The male mold portion is inserted into the female mold portion in a manner such that: (1) the lens-forming material is bound by the optical molding surfaces of the two mold portions surrounded by the flexible rim, and (2) the principal longitudinal axis of curvature of each molding surface is not coincidental or in alignment with each other but rather forms an angle termed θ.

For convenience, the principal longitudinal axis of curvature with respect to the female molding surface (a principal longitudinal axis which can be considered, for convenience and ready reference, to be the ordinate or "y" axis) is maintained fully perpendicular to two axes which are tangent to the base or apex of the female molding surface, each of the said two axes being perpendicular to each other and in the same plane. The said two axes can be considered to be the "x" axis (abscissa) and the "z" axis. The principal longitudinal axis of curvature of the male molding surface would involve the corresponding axes (which, for convenience, can be designated as the y', x' and z' axes). Thus, as illustrated in the drawings, the angle θ represents the deviation from alignment of these two principal longitudinal axes (y and y'), one of which is maintained fully perpendicular as noted above, and the other being oblique. The angle θ, in effect, defines the amount of prism ballast which is traditionally measured in diopters and which is imparted to the toric lens produced by the practice of one embodiment of the invention. Broadly, this angle θ can range up to about 15 to 20 degrees, but is generally only up to 10°. In practice the angle θ is within the range of about 2° to about 8°, preferably about 3° to about 6°.

In various other embodiments the male mold portion is provided with a substantially cylindrical support segment having the optical molding surface attached circumferentially around the lower portion of the support segment. The female portion, in preferred embodiments, is provided with a hollow cylindrical support segment having the optical molding surface attached circumferentially around its base. The optical molding surfaces can be spherical or aspherical. The inner diameter of the cylindrical support segment of the female mold member is somewhat larger than the external diameter of the hollow cylindrical support segment of the male mold member so that there is sufficient clearance for the male support segment to be insertable into the female cylindrical support segment to obtain the desired angle θ and to permit lens-forming material to flow out between the two segments and/or otherwise be removed. The clearance, however, should not be so great as to permit the two principal axes to be non-aligned to a significant degree which would adversely affect the optical characteristics of the lens to be produced. In another rembodiment the receiving mold component has a hollow cylindrical support segment or wall that is present at a selected angle so that the lens-forming material between the male and female mold portions is compressed and positioned at a predetermined angle θ.

When the lens to be cast has a toric optical surface and optionally has prism ballast, the molding operation can be readily coordinated to correctly position the major axis, the prism ballast, and the location of the chord of the truncation. For example, when the first flexible mold portion, preferably the female mold portion, is distorted or "crimped" using two opposing set screws the major axis of its optical (toric) surface (and the resulting lens) will be perpendicular to the direction of the set screws impinged on the flexible mold. The second mold portion, preferably the male mold portion, when inserted can be positioned, for example, so that the chord of truncation is parallel to the major axis of the optical (toric) surface. The angle of insertion (angle $\theta$) is coordinated with both the major axis and the chord to position the area of prism ballast adjacent the chord (of the resulting lens) which when properly positioned on the eye will be proximal to the lower eyelid. In this illustration approximately 45 percent of toric corneas can be properly fitted. Reproducible correction of a toric cornea requires, among other conventional considerations, accurate determination of the major axis of the toric eye surface. Then, one coordinates the angle of insertion and the chord (of the second mold portion) relative to the major axis (of the first mold portion) to obtain truncated, prism ballasted toric contact lenses which possess outstanding positional stability on the eye.

DETAILED DESCRIPTION OF THE DRAWINGS

The present invention, in its preferred aspect, employs a flexible female mold portion to provide the finished lens with a toric configuration on the front or anterior optical surface. The desired amount of prism ballast, customarily measured in diopters, is imparted to the finished molded lens by inserting one of the mold parts into the other mold part so that the desired angle $\theta$ is subtended by the principal longitudinal axis of curvature of each molding surface. The angle $\theta$, in effect, governs the amount of prism ballast. Thus, a value of about three degrees (3°) for the angle $\theta$ will result in lenses having a prism of about 0.5 diopter; and angle $\theta$ of 6° results in a prism of about 1.5 diopters.

The lenses produced by the present invention are either mono- or bitruncated. The lenses, in a highly preferred aspect, are provided with prism ballast which is a weighted portion of the produced lens which allows gravity to correctly position the lens. The truncated, prism ballasted toric lenses of the invention have been observed to possess outstanding positional stability on the eye, e.g., average lens rotation is less than approximately 4°. While "prism" or "prism ballast" is an indication of weight or mass, the thickening of the lens causes diffraction of light rays passing through the thickening area. This diffraction is measured on a Vertexometer which gives a reading in diopters. Thus, measurement of prism in diopters is an indirect measurement of the weight of the prism.

When toric lenses are desired a second adjustment provides for the required configuration of the optical molding surface of the flexible female mold member, for example, by impinging two opposed set screws into contact with the lower portion of this mold member, thus distorting the female optical molding surface and achieving the required toricity for the molded lens. While there are numerous variations possible as to this second adjustment relative to the first angle of insertion adjustment, for purposes of the following description it will be assumed that the impingement of "flexing" of the lower mold portion and the angle $\theta$ is achieved by "tilting" one of the mold parts with respect to the other are both in the same plane.

Figure 1:
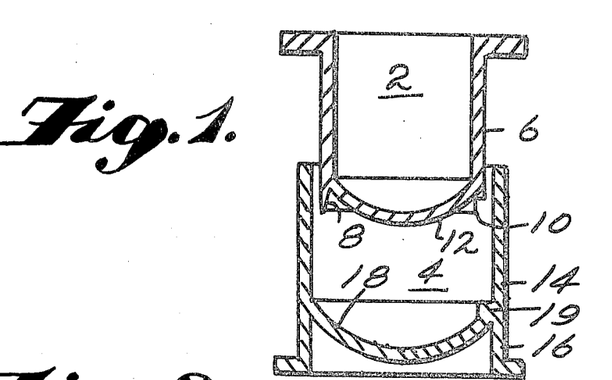
FIG. 1 is a plan cross-sectional view of a replica lens mold in the open position.

As shown in FIG. 1, the replica mold comprises a male mold member 2 which may be of a flexible or rigid material and a female mold member 4. The male mold member 2 includes a substantially cylindrical support segment 6 having attached to the lower end thereof a flexible rim 8. The cylindrical support segment 6 may be hollow, as shown, or a solid mass of material. The flexible rim 8 is circular about most of its periphery having a flat portion 10 defining the chord or truncation for the lens to be cast in the mold. Support segment 6 is closed by optical molding surface 12 circumferentially attached to the bottom of support segment 6. The curvature of molding surface 12 is selected in order to correspond with the optical requirements of the lens to be produced. The curvature may be entirely spherical, aspherical or combinations of both. The female molding surface 18 may also be toric in which case means to effect distortion of its molding surface as illustrated in the discussion with respect to FIG. 4 below are not necessary.

Female mold member 4, which may be rigid or flexible, includes a cylindrical support segment or wall 14 in a base 16 set circumferentially thereto and an optical molding surface 18 set internally in cylindrical support segment 14. Optical molding surface 18 is provided with an extended area 19 to complement the space between straight portion 10 of the rim and the support segment 6. The internal diameter of female support segment 14 is somewhat larger than the external diameter of male support segment 6 to allow freedom of insertion. As with the male molding surface 12, the curvature of female molding surface 18 may be entirely spherical, aspherical or combinations thereof.

Figure 2:
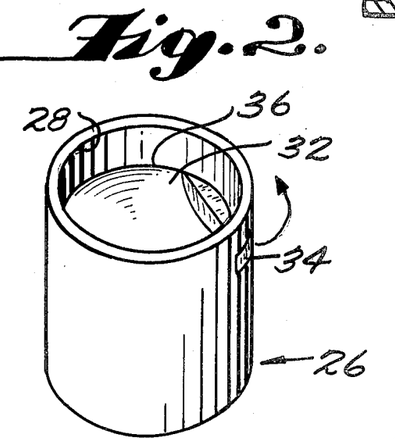
FIG. 2 is an elevated perspective view of a metal master mold for making the upper mold portion of the replica mold of FIG. 1.
Figure 3:
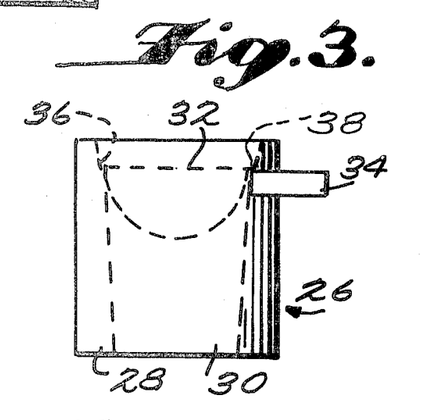
FIG. 3 is a plan cross-sectional view of the metal master mold of FIG. 2 with the truncation-shaping insert partially removed.

FIGS. 2 and 3 are elevated perspective and partial cross-sectional views, respectively, of the metal master mold 26 from which the male replica mold portion 2 is formed. The metal master mold 26 is assembled from essentially three pieces of metal: a cylindrical outer shell 28, a removable insert 30 having a highly polished molding surface 32 that forms optical molding surface 12, and a truncation shaping insert 34 with a straight edge to form the corresponding straight portion 10 of flexible rim 8. The other major surface of insert 34 is conveniently tapered to correspond to the overall circumference of the cylindrical outer shell 28. The taper of the cylindrical outer shell 28 and the removable insert 30 are complementary, as shown. A small, substantially circular valley 36 is defined by the careful positioning of the cylindrical outer shell 28 and the removable insert 30 which in the male replica mold portion corresponds to flexible rim 8. Removable insert 30 and the truncation shaping insert 34 together define a straight valley 38 connecting the two ends of circular valley 36 to define the straight portion 10 of flexible rim 8. The dimensions of the continuous valleys 36 and 38 are predetermined and will be fixed by cylindrical outer shell 28 and inserts 30 and 34.

Figure 4:
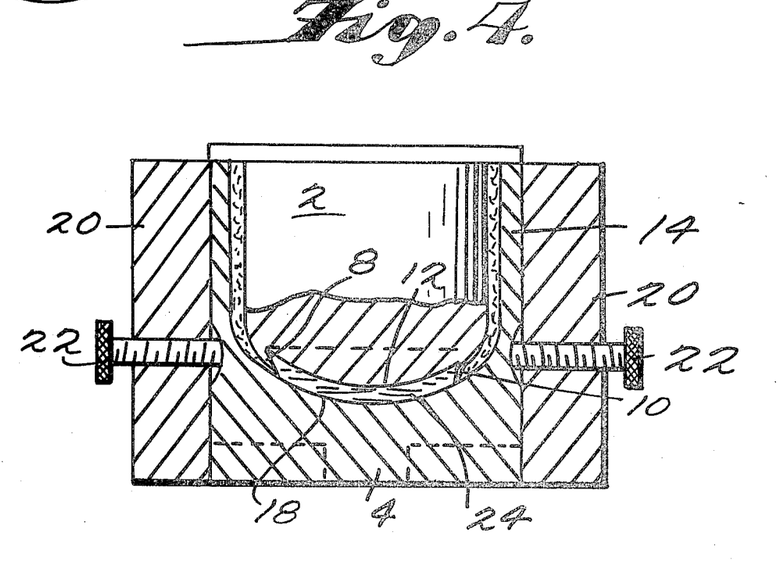
FIG. 4 is a plan cross-sectional view of a replica lens mold in the closed position and the circumferential torque ring positioned to apply a shaping force to the lower portion of the mold.

FIG. 4 is another embodiment of the invention, similar to FIG. 1, but also including a circumferential torque ring 20 placed around female replica mold member 4. Opposing adjustment screws 22 are provided which when rotated inwardly, impinge on and deflect the female mold member which for this embodiment is flexible. Torque ring 18 has an internal diameter which is slightly larger than the external diameter of cylindrical support segment 14 so that ring 20 may be conveniently removed and attached to the lower mold portion from one mold to another. The ring 20 is preferably fabricated from metal such as brass or the like.

Figure 5:
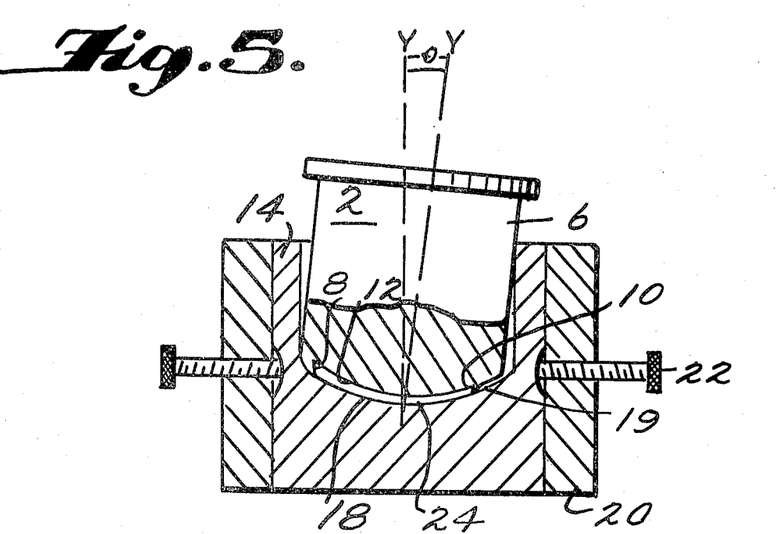
FIG. 5 is a plan cross-sectional view of a replica lens mold in the closed position and circumferential torque ring positioned about the lower portion of the mold and the upper portion of the mold tilted to an angle θ to produce a truncated, toric lens with prism ballast.
Figures 6, 7:
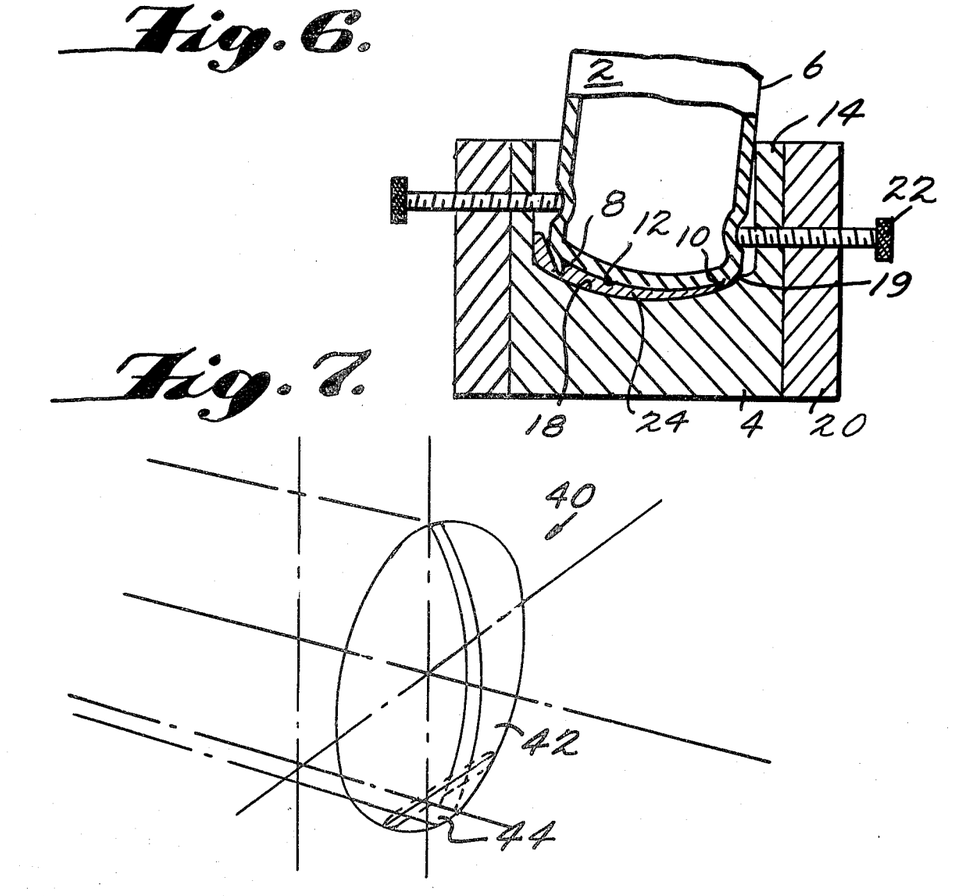
FIG. 6 is a partial cross-sectional view of a replica lens mold similar to FIG. 5 but with the torque ring set screws impinging upon the upper mold portion to produce a truncated toric contact lens with prism ballast.

While the female replica mold portion is illustrated as being flexible it is also possible to flex the male replica mold portion 2 and selectively distort the molding surface 10 thereon as shown in FIG. 6 and described in more detail below. Various arrangements for flexing the replica molds are also illustrated and described in more detail in U.S. Pat. No. 4,208,365, identified above. Lens-forming material 24, which when polymerized defines the finished truncated lens, is shown between the two molding surfaces. The procedure of molding a toric truncated contact lens using a mold assembly in the manner of FIG. 4 is described in more detail below in respect of FIGS. 5 and 6.

FIGS. 5 and 6 illustrate embodiments of the invention—the apparatus employed to form a toric truncated contact lens having prism ballast—in which the male mold member 2 is movable from side-to-side or "tiltable" within the female mold member. Replica male mold member 2 is inserted at an angle $\theta$ from a line extending through the center of molding surface 18 as well as being perpendicular thereto. The internal diameter of the female mold support segment 14 is somewhat larger than the external diameter of the male support segment 6 to properly accommodate the desired angle $\theta$ which is desirably in the range of from about 2° to about 8°. In FIG. 5 the adjustment screws 22 impinge upon a flexible female portion 4 while in FIG. 6 the adjustment screws 22 impinge upon and selectively distort flexible male mold portion 2. The adjustment screws may be in the same plane with respect to each other, as shown in FIG. 5, or in different planes, as shown in FIG. 6.

Referring specifically to FIGS. 5 and 6, during operation of the process a first adjustment is made to the configuration of the lower part of the female mold portion by impinging the adjustment screws on the mold, then the lens-forming material 24 which will eventually constitute the contact lens per se is placed into the female mold portion. Support segment 6 of male mold portion 2 is inserted into support segment 14 of female mold portion 4 and any excess lens-forming material 24 is squeezed out between the annular-like space between the two mold portions. It will be understood that in the embodiment shown in the figures no runoff channels in the mold portions are illustrated. Molds with runoff channels or other means for permitting removal of excess lens-forming material is within the scope of the present invention.

When the male mold portion 2 is urged against molding surface 18 of the female mold portion 4, the flexible rim 8 and straight portion 10 thereof move inwardly towards its principal longitudinal axis defining the edge of the lens thus molded. Truncated contact or toric lenses thus prepared may have undesirable flashing or excess molded material at their periphery which can be removed by conventional means, e.g., polishing or buffing operation, if required.

Various means, in addition to those specifically shown in FIGS. 5–6, can be employed to retain the mold members in a fixed closed position thus preventing angle $\theta$ from varying from a preset value. For example, the mold system may be retained in a press or vise so as to prevent movement of the mold members during lens-forming operations.

The process of molding non-truncated contact lenses in molds of the type illustrated in FIG. 4 is described in detail in U.S. Pat. No. 4,208,365, the disclosure of which is fully incorporated by reference as if set out in full text. During the molding operation, the lens-forming material may contract and the contraction may be as much as 20% of its volume originally present between the molding surfaces. Desirably, a slight external pressure can be applied, generally on the male mold portion, to ensure that the molding surfaces remain in contact with the lens-forming material during contraction. The application of such external pressure is optional; however, in certain cases it may give rise to improved results. After the molding step is completed, the molds are separated and the lens 40 so produced as shown in FIG. 7 is removed from the mold in a condition ready to use except for cleaning and perhaps a buffing of the lens edges. The optical surfaces of the lens are in their desired states.

As shown in FIG. 7, the lower portion 42 of the lens 40 is thicker than the upper portion of the lens thus showing the prism ballast obtained by the practice of an embodiment of the invention. The present illustration provides a single truncated lens, shown in outline at 44 as to the "missing" portion, although a double truncation may also be produced by suitably altering the metal master mold and, in turn, the plastic replica mold.

When a truncated toric lens is desired, be it with prism ballast or not, the following procedure in respect of FIGS. 4–6 can be used: The radius of the female mold portion 4 is adjusted by placing it into the circumferential torque ring 20 and adjusting the opposing set screws. The female mold portion provides an optical surface to the resulting lens and a mold is selected or fabricated having the desired radius. The female mold portion 4 and attached circumferential torque ring assembly 20 are placed into a Keratometer and the set screws 22 are adjusted, optionally using a micrometer or other means, to vary the radius of the female mold portion 4 in both the horizontal and vertical plane with respect to the finished lens.

As an example, starting with a spherical radius of 8.00 mm for the female mold surface 18, the female mold portion 4 plus torque ring assembly 20 are placed in a Keratometer, the set screws 22 may be tightened to impinge on the female mold portion 4 to flatten the horizontal radius to say 8.10 mm and steepen the vertical radius to say 7.90 mm. Thus using predetermined radii in conjunction with a known base curve radius will result in known horizontal and vertical powers. The greater the radii differential the greater the difference between horizontal and vertical powers, hence the greater the cylinder.

In another embodiment of the invention as shown in FIG. 6 the male mold portion 2 is flexible and produces a toric configuration on the base or posterior surface 10 of the contact lens. The mold and molding procedure operates in substantially the same manner, subject to some minor variations, as will be apparent from the above description with respect to FIGS. 4 and 5. The quantity of lens-forming material illustrated in FIG. 6 is somewhat exaggerated to illustrate the lens shaping that occurs.

It will be understood that the number and placement of adjustment screws about the circumference of torque ring 20 may be varied depending upon the desires of equipment design and the exact shape of the lens to be fabricated. For convenience, two screws 20 are illustrated, one positioned directly across from the other. Although it is not required that the set screws be on the same plane. As an example, in the embodiment of FIG. 6 the two set screws are offset which serves to maintain the desired $\theta$ angle as well.

The molds are themselves preferably manufactured from thermoplastic materials, for example low density polyethylene or polypropylene. These and other suitable materials are described in U.S. Pat. Nos. 4,208,365 and 4,121,896, the disclosures of which are fully incorporated herein by reference as if set out in full text.

The process of the invention is not limited to truncated soft plastic contact lenses, i.e., hydrogels in their hydrated state, although these are preferred articles. Also included are the hard or rigid truncated contact lenses as well as flexible, hydrophobic truncated contact lenses.

The novel process results in advantages over prior art methods in that a truncated contact lens is cast directly from the desired lens-forming material; polishing of the optical surfaces is not required; only minimum finishing or buffing of the lens edges may be required; and the overall manufacturing is far less labor intensive than with prior procedures, e.g., lathe procedure. As with most soft lenses the lens will be washed with water to remove any catalyst residue and unreacted monomer, then equilibrated in aqueous or saline solution to attain their final dimensions.

By practice of a preferred aspect of the invention there is obtained, in an economic manner, a wide variety of truncated toric contact lenses which exhibit a wide range of cylinder powers and significant positional stability in the eye of the wearer, i.e., a truncated lens preferably with prism ballast, previously only available if at all by costly and time-consuming manual machining and polishing techniques.

By the practice of the invention there can be obtained, as a novel article of manufacture, a molded, truncated, toric-shaped contact lens having a continuous smooth circumference interrupted by a chord on the circumference defining a truncation, prism ballast, and cylinder, which lens in its corrective astigmatic position on the toric cornea does not rotate more than an average of about 4°, preferably not more than about 2°. Moreover, it has been observed that when the said lens is rotated 90° on the eye from its normal fixed position, the lens returns to within about 4°, preferably within about 2° of the normal fixed position, generally within about 45 seconds or less. Preferably said novel article is a hydrogel, especially a hydrophilic polymer containing a major amount of 2-hydroxyethyl methacrylate (HEMA).

The design of the lenses produced by the invention is not restricted to any particular set of parameters. Both anterior and posterior optical surfaces of the lenses may consist of aspherical curves. The central portion of the lens may consist of spherical curves on either or both the anterior and posterior surface, and the periphery of the anterior surface may consist of a steeper or flatter spherical curve, and the periphery of the posterior surface may be aspheric to achieve a combination of improved fitting characteristics.

One of the molding surfaces, usually the male mold member, is provided with a flexible, integral circumferential rim which in the practice of a preferred aspect of the invention will define the periphery or edge of the resulting truncated contact lens. During the molding operation, the lens-forming material contacts (especially during addition or condensation reactions) causing the flexible rim to flex whereby the two mold members move toward each other. For further details of flexible rim construction, materials, etc., one is referred to U.S. Pat. Nos. 4,121,896 and 4,208,365, the disclosures of which are fully incorporated by reference as if set out in full text.

Means can be provided to effect a predetermined or measured stress or force on a flexible mold portion, be it the female portion or the male portion, preferably on the female portion. Such means can be illustrated by various tension-creating devices, e.g., a spring loader plunger in which the plunger creates a predetermined force on the wall of a flexible mold member thereby causing its optical surface to assume the desired toric configuration; a flexible closed spring which performs the same function; a circumferential torque ring which applies pressure to a flexible mold portion, the torque ring having adjustable impingement means such as screws or the like for deforming the flexible mold portion into the desired toric configuration. Desirably there are at least two impingement means but there can be more, e.g., 3 or 4. Any other adjustment means can be employed to place a stress on the flexible mold whereby its molding surface is deformed to a predetermined toric configuration. Information regarding the fabrication and composition of the mold components as well as method of flexing one of them and achieving a toric surface on the contact lens are described in U.S. Pat. No. 4,208,365, issued June 7, 1980, the disclosure of which is fully incorporated by reference as if set out in full text.

The truncated contact lenses produced by the present invention may be flexible, hydrophobic lenses as exemplified by the unsubstituted and fluorosubstituted polyethylene, the silicone elastomers, etc.; or such contact lenses may be the so-called hydrophilic lenses desirably having a three-dimensional structure such as polymers of 2-hydroxyethyl methacrylate, the various hydrolyzed hydrophilic collagen products, etc. The hydrophilic lenses are water-insoluble, water-swellable, and when immersed in water or saline solution swell to attain their final dimensions. The resulting water-swollen lenses may be properly termed hydrogel lenses.

Monomer, prepolymer or vulcanizable mixtures particularly useful in the practice of this invention include hydrophobic acrylic esters, suitably lower alkyl acrylic ester, the alkyl moiety containing 1–5 carbon atoms, such as methyl acrylate or methacrylate, ethyl acrylate or methacrylate, n-propyl acrylate or methacrylate, isopropyl acrylate or methacrylate, isobutyl acrylate or methacrylate, n-butyl acrylate or methacrylate, or various mixtures of these monomers. For increased dimensional stability and resistance to warpage the above monomers or monomer mixtures may be further admixed with a minor proportion of di- or polyfunctional polymerizable species to cause cross-linking of the polymeric matrix as polymerization proceeds. Examples of such di- or polyfunctional species include: divinylbenzene, ethylene glycol diacrylate or methacrylate, propylene glycol diacrylate or methacrylate, and the acrylate or methacrylate esters of the following polyols: triethanolamine, glycerol, pentaerythritol, butylene glycol, diethylene glycol, triethylene glycol, tetraethylene glycol, mannitol, sorbitol and the like. Other cross-linking monomers may include N,N-methylene-bisacrylamide or methacrylamide, sulfonated divinylbenzene, and divinyl sulfone.

Further, the above monomers or mixtures thereof may be further mixed with linear polymeric species which are soluble therein as long as the viscosity of the solution or "casting syrup" formed thereby does not become sufficiently great that difficulty in removing bubbles therefrom is encountered.

Other monomeric materials suitable for producing lenses via this invention are hydrophilic monomer mixtures forming three-dimensional cross-linked networks such as those described in U.S. Pat. No. 3,822,089. Illustrative hydrophilic monomers include water soluble monoesters of an acrylic acid or methacrylic acid with an alcohol having an esterifiable hydroxyl group and at least one additional hydroxyl group such as the mono- and polyalkylene glycol monoesters of methacrylic acid and acrylic acid, e.g., ethylene glycol monomethacrylate, ethylene glycol monoacrylate, diethylene glycol monomethacrylate, diethylene glycol monoacrylate, propylene glycol monomethacrylate, dipropylene glycol monoacrylate, and the like; the N-alkyl and N,N-dialkyl substituted acrylamides and methacrylamides such as N-methylacrylamide, N,N-dimethylacrylamide, N-methylmethacrylamide, N,N-dimethylmethacrylamide, and the like; N-vinylpyrrolidone; the alkyl substituted N-vinylpyrrolidones, e.g., methyl-substituted N-vinylpyrrolidone; glycidyl methacrylate; glycidyl acrylate; and others known to the art. Also useful are the vulcanizable silicone fluids or elastomers. Preferably, the alkyl and alkylene moieties in the aforementioned subclasses of compounds contain up to 4 carbon atoms.

With the hydrophilic monomer or mixtures thereof, it is preferred that a 3-dimensional cross-linked network be formed. For this purpose it is desirable to employ small amounts of cross-linking monomers such as those illustrated above with respect to the discussion on hydrophobic acrylic esters or other cross-linking technique, e.g., radiation.

Preferred monomeric mixtures contain at least one alkylene glycol monoester or methacrylic acid, especially ethylene glycol monomethacrylate, and at least one cross-linking monomer such as the alkylene glycol diester of methacrylic acid, especially ethylene glycol dimethacrylate. Such mixtures may contain other polymerizable monomers, desirably in minor amounts such as N-vinylpyrrolidone, methyl methacrylate, acrylamide, N-methacrylamide, diethylene glycol monomethacrylate, and others illustrated above.

The polymerization reaction can be carried out in bulk or with an inert solvent. Suitable solvents include water; organic solvents such as water-soluble lower aliphatic monohydric alcohols as well as polyhydric alcohols, e.g., glycol, glycerol, dioxane, etc.; and mixtures thereof. In general, the solvent, if employed, can comprise a minor amount of the reaction medium, i.e., less than about 50 weight percent.

Polymerization of monomer mixtures is usually carried out with free radical catalysts of the type in common use in vinyl polymerization. Such catalyst species include organic peroxides, percarbonates, hydrogen peroxides, and inorganic materials such as ammonium, sodium, or potassium persulfate. Polymerization using such catalysts may occur at temperatures between ambient temperature, i.e., about 20° C. or up to about 120° C., depending on the speed of polymerization desired.

Polymerization may also occur between monomer or prepolymer mixtures under the influence of elevated temperatures or radiation (U.V., X-ray, or other well-known forms of radioactivity).

With silicone elastomers, vulcanization may take place via a free radical during mechanism, or, in the case of two-part so-called RTV compounds vulcanization may occur through displacement or condensation reactions. Patents which further illustrate lens-forming materials useful in the preparation of contact lenses include, by way of examples, U.S. Pat. No. Re. 27,401; U.S. Pat. Nos. 3,639,524; 3,699,089; 3,700,761; 3,822,089; 4,121,896; 4,208,365; and 4,223,984; the full disclosures of which are incorporated by reference as if set out in full text.

The following are further illustrative, but not limiting, of the present invention using the molding apparatus as illustrated in FIG. 5. It will be appreciated that various polymerizable mixtures suitable for fabricating contact lenses and adjustment procedures, either to the female mold portion, as below, the male mold portion, or both, may be used. Unless otherwise indicated all parts and percentages are by weight.

Female and male thermoplastic polypropylene molds can be prepared by conventional injection molding technique from a master steel mold assembly. The convex male steel mold portion (see FIGS. 2-3) has the following mold dimensions: diameter of spherical molding surface 32 is 12.00 mm; outer and inner diameters of cylindrical shell 28 are 17.2 mm and 12.0 mm, respectively. Opening for slot 34 is 3.3 mm wide and 6.00 mm from the top of cylindrical shell 28 to the upper edge of said opening, the upper edge coinciding with the top portion of valley 36; the maximum depth of the opening for slot 34 is 3.4 mm, thus the resulting truncation is 0.8 mm (maximum, measured from the circumference to the chord along a line perpendicular thereto). The opening is made by grinding with a 818 Brown and Sharpe surface grinder. A key insert (truncation shaping insert) 34 is prepared to fit into opening 34 with a light press fit and to conform with the outer surface of cylindrical shell 28. As indicated previously, removable insert 30 (see FIG. 3) is characterized by molding surface 32 and truncation shaping insert 34 is characterized by a straight edge. A small, substantially circular valley is defined by polishing and positioning cylindrical outer shell 28 and removable insert 30 which results in flexible rim 8 in the male replica thermoplastic mold (see FIGS. 3-4). One can also use a convex male steel mold and a concave female steel mold, respectively, having mold dimensions approximately those of the Examples of U.S. Pat. No. 4,208,364 and modified as shown in FIG. 2 herein with respect to truncating insert 34. The disclosure of U.S. Pat. No. 4,208,365 can also be followed (note, for example, the paragraph bridging columns 8-9 of U.S. Pat. No. 4,208,356) to produce the truncated toric lens in accordance with the doctor's prescription.

EXAMPLE 1

A hydrophilic contact lens having a toric front surface was prepared using a lens mold of polypropylene of the type described and illustrated in U.S. Pat. No. 4,121,896, issued Oct. 24, 1978 except that the internal diameter of cylindrical support segment 14 of female mold member 4 is slightly larger than the external diameter of support segment 6 of the male mold member 2 to properly accomodate the angle $\theta$ as desired; see FIG. 5. The material used was composed substantially of 2-hydroxyethyl methacrylate (HEMA), and due to the fact that the resulting polymer of HEMA swells in water or a physiologic solution by a factor of say 1.2, the wet lens that results is lesser in power by a factor of approximately 69%. The female mold selected had an optical curve spherical radius of 7.54 mm, and a base curve radius of 7.00 mm, and a diameter of 11.7 mm.

After selecting the proper mold sizes the torque ring was placed over the flexible female optical curve mold member and the adjustment screws tightened only to the point of contact with the mold. Next the assembly was placed in a Keratometer and the screws adjusted to flex the mold to have the desired radii, which in the present instance was a horizontal radius (major) of 7.63 mm and a vertical radius (minor) of 7.48 mm. The two torque screws were tightened evenly until the desired radii were observed.

Having thus adjusted the flexible female mold member, the assembly was removed from the Keratometer and charged with 1 ml. of a lens-forming mixture having the following ingredients:

| Component | Parts by Weight |
| --- | --- |
| 2-hydroxyethyl methacrylate | 98.3 |
| diethylene glycol monomethacrylate | 0.8 |
| ethylene glycol dimethacrylate | 0.4 |
| methacrylic acid in trace amounts plus other impurities | 0.5 |
| Percadox 16[a] | 1.0 |

[a]Bis(4-tert.butylcyclohexyl)peroxydicarbonate.

Next the male base curve mold member with a radius of 7.00 mm was inserted into the adjusted, charged female optical curve mold member at an angle θ of 5°. That is to say, the principal longitudinal axis of curvature of the male member, inserted so as to be perpendicular to the major axis (meridian) on the resulting female toric molding surface, formed with the principal longitudinal axis of curvature of the female member an angle θ equal to 5°. The truncated chord (maximum distance of 1.2 mm from the circumference of the truncated portion) of the inserted male mold member is positioned so as to be parallel with the major axis of the toric molding surface. The flexible rim portion of the male member and the optical surfaces of both the male and female member enclose and bound the lens-forming mixture. The male mold member was maintained in a fixed position of "tilt", i.e., angle θ of 5°, by means not shown in FIG. 5. The inserted male mold member forced out a small amount of the lens-forming mixture as well as any bubbles from the mold system. The mold system was placed in a circulating air oven at 105° C. for approximately 30 minutes to polymerize the monomer. After polymerization and cooling, the mold members were separated and a hard, dry lens removed. The lens edge was buffed to remove any slight roughness. The finished contact lens was placed in a physiological solution. As measured on a Nikon Vertexometer, the lens had a major power (wet) of −2.00, a minor power (wet) of −1.50, a cylinder of −0.50, a toric front surface, and a prism ballast of 1.0 diopter. The center thickness of the toric lens was about 0.09 mm. When the toric lens was placed on the eye, its major axis (of the lens) was 180° and the truncation and prism ballast were proximal to the lower eyelid, i.e., its stabilized position was 0° deviation from the vertical axis of the lens. When the lens on the eye was rotated 90° by hand, the lens returned to within 2° of its stabilized position in 30 seconds. The aforesaid lens characteristics are considered to be outstanding.

EXAMPLES 2-6

In Examples 2-6 the procedure of Example 1 was repeated. The data are set forth in Table I below.

TABLE I

| Example | Base Curve[1] | Power (wet) Major | Minor | Cylinder | Lens Axis | Stabilized Position[2] | Deviation From Stabilized Position[3] | Time to Return to Stabilized Position[4] |
| --- | --- | --- | --- | --- | --- | --- | --- | --- |
| 2 | 8.44 | −2.75 | −2.00 | −0.75 | 10° | 0° | 0° | 45 sec. |
| 3 | 8.71 | −2.75 | −1.50 | −1.25 | 175° | 2° | 2° | 30 sec. |
| 4 | 8.21 | −2.75 | −1.75 | −1.00 | 180° | 2° | 4° | 2 min. |
| 5 | 8.63 | −2.50 | −1.50 | −1.00 | 10° | 0° | 0° | 15 sec. |
| 6 | 8.28 | −2.75 | −2.00 | −0.75 | 10° | 4° | 2° | 20 sec. |

[1]Base curve of hydrated toric lens
[2]Represents the number of degrees deviation from the vertical axis of stabilized toric lens on the eye.
[3]Toric lens on the eye was rotated 90° by hand. In all instances the lens returned to within 0°-4° of its stabilized position.
[4]Time required for lens to return to stabilized position after lens was rotated 90° by hand.

EXAMPLE 7

Examples 2-6 are repeated except the following polymerization mixture is used:

| Component | Parts by Weight |
| --- | --- |
| 2-hydroxyethyl methacrylate | 65 |
| N,N-dimethylacrylamide | 35 |
| Water, distilled | 30 |
| diethylene glycol dimethyl ether | 20 |
| methylene-bis-acrylamide | 0.3 |
| diisopropyl percarbonate | 0.3 |

After equilibration, the resulting truncated, prism ballasted, toric lenses are found to possess characteristics substantially similar to those set out in Table I supra.

EXAMPLE 8

The general procedure of Example 7 is repeated using a two-part room temperature vulcanizable transparent methyl silicone liquid which is mixed prior to adding 0.5 cc of the resulting mixture into the receiving mold member. The male support segment is inserted displacing excess vulcanizable liquid. The two mold members are lightly pressed together to insure seating and perhaps some flexing of the flexible rim on the opposite molding surface. The mold system is placed in a circulating air oven at 140° C. for 2.5 hours. After cooling, the mold is opened. There is obtained a truncated lens with a toric front surface exhibiting cylinder, prism ballast, and outstanding positional stability.

What is claimed is:

1. A mold for producing a truncated contact lens comprising:
   a male portion including a substantially cylindrical support portion and a first optical molding surface having a principal longitudinal axis, said molding surface having a predetermined curvature to form a first optical surface of said desired contact lens;
   a female portion including a second optical molding surface having a principal longitudinal axis having a predetermined curvature to form a second optical surface of said desired contact lens, said female portion comprising a hollow cylindrical portion having an open upper end and a closed lower end;

one of said optical molding surfaces having a periphery composed of a circular portion having two ends and a straight line connecting the two ends defining a chord whereby the chord defines the truncation on the molded contact lens; and a continuous, flexible rim portion provided about said periphery integral with said optical molding surface and having in its circular portion an axis common with the principal longitudinal axis of the mold portion to which it is attached.

2. A mold in accordance with claim 1 wherein the rim portion is attached to the male portion.

3. A mold in accordance with claim 2 wherein the male portion has a substantially convex molding surface and the female portion has a substantially concave molding surface.

4. A mold in accordance with claim 2 wherein the male portion has a substantially concave molding surface and the female portion has a substantially convex molding surface.

5. A mold in accordance with claim 1 wherein the mold is constructed of thermoplastic material.

6. A mold in accordance with claim 5 wherein the periphery has two chords therein substantially parallel to each other.

7. A mold in accordance with claim 1 or 5 wherein the integral rim portion is flexible inwardly towards the axis of the molding surface.

8. A mold in accordance with claims 1, 2, or 3 in which the optical molding surface of the female mold portion has a toric optical surface.

9. A mold for producing a truncated contact lens comprising:

a male portion including a substantially cylindrical support portion having a principal longitudinal axis and a first optical molding surface attached circumferentially to said cylindrical support portion, said molding surface having a predetermined curvature dimensioned to form the optical surface of said desired contact lens;

a female portion comprising a hollow cylindrical portion having a principal longitudinal axis and having an open upper end and a closed lower end, the internal diameter of said female cylindrical portion being sufficiently greater than the external diameter of said male support portion to permit frictionless insertion of the male portion thereinto, said female portion being circumferentially closed at the lower end thereof by a second optical molding surface having a predetermined curvature to form a second surface of said desired contact lens;

one of said optical molding surfaces having a periphery composed of a circular portion having two ends and a straight line connecting the two ends defining a chord whereby the chord defines the truncation on the molded contact lens; and a continuous, flexible rim portion provided about said periphery integral with said optical molding surface and having in its circular portion an axis common with the principal longitudinal axis of the mold portion to which it is attached, said rim portion being flexible inwardly towards the axis of the molding surfaces whereby said flexible rim allows for relative movement between said male portion and female portion when said portion are in contact with each other.

10. A process of producing truncated contact lens in a single direct casting procedure comprising the steps of:

(a) charging a mixture comprising vulcanizable or polymerizable constitutents to a first mold portion of a thermoplastic mold for producing a contact lens, said thermoplastic mold comprising:

(i) a first mold portion including a first molding surface having a principal longitudinal axis, said first molding surface having a predetermined curvature to form a first surface of the desired contact lens;

(ii) a second mold portion including a second molding surface having a principal longitudinal axis, said second molding surface having a predetermined curvature to form a second surface of the desired contact lens;

one of said molding surfaces having a periphery composed of a circular portion having two ends and a straight line connecting the two ends defining a chord whereby the chord defines the truncation on the molded contact lens; and (iii) a continuous, flexible rim portion provided about said periphery, integral with said molding surface and having in its circular portion an axis common with the principal longitudinal axis of the mold portion to which it is attached;

(b) closing the mold by placing the first mold portion and the second mold portion in alignment with each other such that the principal longitudinal axes of the mold portions coincide with each other and in a manner whereby the flexible rim portion is seated circumferentially on the opposite molding surface while retaining said mixture between said molding surfaces and said flexible rim portion to form a totally enclosed space; and (c) subjecting the resulting closed mold system to activating conditions for a period of time sufficient to effect the desired degree of vulcanization or polymerization of said mixture while causing the flexible rim portion to flex in a generally uniform manner with respect to the axis of said molding surface such that said mold portions approach each other during vulcanization or polymerization; and (d) recovering the resulting product having the shape of a truncated contact lens.

11. The process according to claim 10 including applying external pressure to the mold during the polymerization step.

12. The process of claim 11 wherein said mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

13. The process of claim 12 wherein said mixture comprises 2-hydroxyethyl methacrylate.

14. The process in accordance with claim 10 in which one of the molding surfaces has an optical toric configuration.

15. A process for producing a truncated hydrophilic contact lens having a 3-dimensional cross-linked network in a single, direct casting procedure in a closed mold system which includes:

(i) a thermoplastic male portion including a substantially cylindrical support having a principal longitudinal axis and a first molding surface attached circumferentially to said cylindrical support, said molding surface having a predetermined curvature to form a first surface of the contact lens;

(ii) a thermoplastic female portion comprising a hollow cylindrical portion having principal longitudinal axis and having an open end and a closed lower end, the internal diameter of said female cylindrical portion being sufficiently greater than the external diameter of said male support portion thereto, the female portion being circumferentially closed at the lower end thereof by a second molding surface having a predetermined curvature to form a second surface of the contact lens;

one of said molding surfaces having a periphery composed of a circular portion having two ends and a straight line connecting the two ends defining a chord whereby the chord defines the truncation on the molded contact lens; and (iii) an integral rim portion flexible inwardly towards the axis of the molding surfaces, said rim provided about said periphery and having in its circular portion an axis common with the principal longitudinal axis of the mold portion to which it is attached;

said process including the sequential steps of:

A. charging a polymerizable mixture comprising hydrophilic monomer into the female portion of said mold;

B. aligning the male mold portion and the female mold portion so that the principal longitudinal axes of each of said mold portions coincide with each other and closing the mold by slidably engaging the cylindrical support portion of the male portion with the hollow cylindrical portion of the female portion and seating said flexible rim circumferentially on the opposite molding surface while retaining said polymerizable mixture between said molding surfaces and said flexible rim portion to form a totally enclosed space;

C. subjecting the closed mold to polymerization conditions causing said polymerizable mixture to contract during polymerization, thereby urging said molding surfaces towards each other and causing said rim portion to flex inwardly in a uniform manner during such contraction; and D. removing the thus molded truncated hydrophilic contact lens from the mold.

16. The process according to claim 15 wherein external pressure is applied to the closed mold during polymerization step C.

17. The process according to claim 16 wherein said mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

18. A contact lens mold constructed of thermoplastic material comprising:

a male portion including a substantially cylindrical support portion and a first optical molding surface having a principal longitudinal axis, said molding surface having a predetermined curvature to form a first optical surface of said desired contact lens;

a female portion including a second optical molding surface having a principal longitudinal axis, said second molding surfaces having a predetermined toric curvature to form a second optical surface of said desired contact lens, said female portion, comprising a hollow cylindrical portion having an open upper end and a closed lower end;

said male molding surface having a periphery composed of a circular portion having two ends and a straight line connecting the two ends defining a chord whereby the chord defines the truncation on the molded contact lens; and a continuous, flexible rim portion provided about said periphery, integral with said optical molding surface and having in its circular portion having an axis common with the principal longitudinal axis of the mold portion.

19. A contact lens mold constructed of thermoplastic material comprising:

a male mold portion including a substantially cylindrical support portion and a first optical molding surface having a principal longitudinal axis, said molding surface having a predetermined curvature to form a first optical surface to said desired contact lens;

a female portion including a second optical molding surface having a principal longitudinal axis, said second molding surface having a predetermined curvature to form a second optical surface of said desired contact lens, said female portion, comprising a hollow cylindrical portion having an open upper end and a closed lower end;

said male molding surface having a periphery composed of a circular portion having two ends and a straight line connecting the two ends defining a chord whereby the chord defines the truncation on the molded contact lens; and a continuous, flexible rim portion provided about said periphery, integral with said optical molding surface and having in its circular portion having an axis common with the principal longitudinal axis of the mold portion, and torsioning means about said female mold portion for adjustably flexing said second molding surface into a predetermined toric configuration.

20. A process for casting a truncated contact lens from a polymerizable mixture in a single, direct casting procedure in a closed mold system which includes:

(i) a flexible, thermoplastic male portion including a substantially cylindrical support having a principal longitudinal axis and a base curve molding surface attached circumferentially to said cylindrical support, said base curve molding surface having an adjustable curvature to form the base curve surface of the resulting contact lens;

(ii) a female portion comprising a hollow cylindrical portion having principal longitudinal axis and having an open end and a closed lower end, the internal diameter of said female cylindrical portion being sufficiently greater than the external diameter of said male support portion to permit frictionless insertion of the male portion thereto, the female portion being circumferentially closed at the lower end thereof by an integral optical curve molding surface having a predetermined curvature to form the optical curve surface of the resulting contact lens;

one of said molding surfaces having a periphery composed of a circular portion having two ends and a straight line connecting the two ends defining a chord whereby the chord defines the truncation on the molded contact lens; and (iii) a continuous integral rim portion flexible generally inwardly towards the axis of both of said molding surfaces provided about said periphery, integral with said molding surface and having its circular portion in an axis common with the principal longitudinal axis of the mold portion; and (iv) adjustment means operatively associated and in contact with said flexible female mold portion at about the horizontal plane of said optical curve mold surface when the mold is closed for flexing said female mold portion and in turn said integral optical curve surface into a toric configuration;

said process including the sequential steps of:

A. charging a polymerizable mixture into the female portion of said mold;

B. closing the mold by slidably engaging the cylindrical portion of the female portion and seating said flexible rim circumferentially on the opposite molding surface while retaining said mixture between said molding surfaces and said flexible rim portion to form a totally enclosed space;

C. adjusting said adjustment means and in turn said optical curve molding surface into the desired toric configuration;

D. subjecting the closed mold to polymerization conditions causing said polymerizable material to contract during polymerization while urging said molding surfaces towards each other and causing said rim portion to flex inwardly in a uniform manner during such contraction; and E. removing the thus molded contact lens from the mold.

21. A process according to claim 20 wherein external pressure is applied to the closed mold during polymerization step (D).

22. A process of casting a truncated contact lens in a single, direct casting procedure in an adjustable mold which includes:

(i) mold portion including an optical curve molding surface having a principal longitudinal axis, said optical curve molding surface having a predetermined curvature to form the optical curve surface of the desired contact lens;

(ii) a second mold portion including a base curve molding surface having a principal longitudinal axis, said base curve molding surface having a predetermined curvature to form the base curve surface of the desired contact lens;

one of said molding surfaces having a periphery composed of a circular portion having two ends and a straight line connecting the two ends defining a chord whereby the chord defines the truncation on the molded contact lens;

(iii) an integral rim portion flexible generally inwardly towards the axis of both of said molding surfaces provided about said periphery, integral with said molding surface and having its circular portion in an axis common with the principal longitudinal axis of the mold portion; and (iv) a rigid cylindrical rim tensioning means about said second mold portion, said process comprising:

(a) adjusting said tensioning means and flexing said second mold portion to define the desired configuration for said optical curve molding surface;

(b) charging a mixture comprising vulcanizable or polymerizable constituents to the first mold portion of said adjustable mold;

(c) closing the mold by placing the first mold portion and the second mold portion in alignment with each other; and (d) subjecting the resulting closed mold system to activating conditions for a period of time sufficient to effect the desired degree of vulcanization or polymerization of said mixture to produce a contact lens having the desired optical curve in accordance with said adjustments.

23. A contact lens mold for casting truncated contact lens comprising:

a male portion including a substantially cylindrical support portion and a first molding surface having a principal longitudinal axis, said molding surface having a predetermined curvature to form a first optical surface of said desired contact lens;

a female portion including a second optical molding surface having a principal longitudinal axis, said second molding surfaces having a predetermined curvature to form a second surface of said desired contact lens, said female portion, comprising a hollow cylindrical portion having an open upper end and a closed lower end;

one of said mold portions provided with a continuous, flexible integral rim about the periphery thereof, said rim having a circular portion with two ends and a straight line connecting the two ends whereby the chord defines the truncation on the molded contact lens, said rim in the shape of the truncated contact lens desired and together with said first and second molding surfaces defining a space within which said lens is molded;

at least one of said male mold portion and said female mold portion being flexible;

torsioning means about said female mold portion for adjustably flexing at least one of said molding surfaces into a predetermined configuration; and adjustment means for adjusting the position of the male mold with respect to the female mold such that the angle $\theta$ subtended by said principal longitudinal axes is not greater than 10° and said tow axes are not parallel.

24. A mold in accordance with claim 23 which is constructed of thermoplastic material.

25. The process of claim 24 wherein said angle $\theta$ is in the range of from about 2° to about 8° and said mixture comprises 2-hydroxyethyl methacrylate.

* * * * *